A United States Patent
Amano et al.

(10) Patent No.: US 10,556,400 B2
(45) Date of Patent: Feb. 11, 2020

(54) BATTERY PACKAGING MATERIAL

(71) Applicant: DAI NIPPON PRINTING CO., LTD., Tokyo (JP)

(72) Inventors: Makoto Amano, Tokyo (JP); Rikiya Yamashita, Tokyo (JP); Atsuko Takahagi, Tokyo (JP)

(73) Assignee: DAI NIPPON PRINTING CO., LTD., Tokyo (JP)

(*) Notice: Subject to any disclaimer, the term of this patent is extended or adjusted under 35 U.S.C. 154(b) by 214 days.

(21) Appl. No.: 15/512,283

(22) PCT Filed: Aug. 31, 2015

(86) PCT No.: PCT/JP2015/074763
§ 371 (c)(1),
(2) Date: Mar. 17, 2017

(87) PCT Pub. No.: WO2016/047389
PCT Pub. Date: Mar. 31, 2016

(65) Prior Publication Data
US 2017/0274622 A1 Sep. 28, 2017

(30) Foreign Application Priority Data
Sep. 26, 2014 (JP) .................................. 2014-197011

(51) Int. Cl.
*B32B 7/12* (2006.01)
*H01G 11/80* (2013.01)
(Continued)

(52) U.S. Cl.
CPC ................. *B32B 7/12* (2013.01); *B32B 15/08* (2013.01); *B32B 15/14* (2013.01); *B32B 15/20* (2013.01);
(Continued)

(58) Field of Classification Search
CPC ......... B32B 15/08; B32B 15/14; B32B 15/20; B32B 2439/00; B32B 7/12; H01G 11/80; H01G 9/08; H01M 2/026; H01M 2/0262; H01M 2/0277; H01M 2/0285; H01M 2/0287
See application file for complete search history.

(56) References Cited

U.S. PATENT DOCUMENTS

2006/0210872 A1* 9/2006 Yageta ..................... H01G 2/10
429/185
2008/0286635 A1 11/2008 Seino et al.
(Continued)

FOREIGN PATENT DOCUMENTS

JP 2008-287971 A 11/2008
JP 2013-174010 A 9/2013
(Continued)

OTHER PUBLICATIONS

Machine translation for JP 2013-174010 A, Tanaka et al., Japan Platform for Patent Information (Year: 2013).*
(Continued)

*Primary Examiner* — Adam A Arciero
(74) *Attorney, Agent, or Firm* — Oliff PLC

(57) ABSTRACT

Battery packaging material wherein a sheet-like laminated body is formed by sequentially stacking at least a base layer, metal layer, and sealant layer, the battery packaging material being equipped with substantially rectangular space that is formed to protrude from the sealant layer side toward the base layer side, and accommodates a battery element on the sealant layer side. In planar view from the base layer side view, a first and second curved sections are provided from the center portion toward the battery packaging material end parts, in a cross section in the thickness direction on a line connecting opposing corner parts protruding in a substantially rectangular shape. The thickness (a) of the metal layer at the first curved section, (c) of the metal layer at the second curved section, and (b) of the metal layer at the section located between the first and second curved sections, satisfy the following relationship a≥b>c or a≥c>b.

12 Claims, 3 Drawing Sheets

(51) Int. Cl.
  *B32B 15/14*      (2006.01)
  *H01M 2/02*       (2006.01)
  *B32B 15/20*      (2006.01)
  *B32B 15/08*      (2006.01)
  *H01G 9/08*       (2006.01)

(52) U.S. Cl.
  CPC .......... *H01G 11/80* (2013.01); *H01M 2/0287* (2013.01); *B32B 2439/00* (2013.01); *H01G 9/08* (2013.01)

(56) References Cited

U.S. PATENT DOCUMENTS

| | | | | |
|---|---|---|---|---|
| 2008/0305391 A1* | 12/2008 | Hirose | ................ | H01M 2/0285 429/164 |
| 2013/0196215 A1* | 8/2013 | Karatsu | ............... | H01M 2/0287 429/176 |
| 2014/0170472 A1 | 6/2014 | Hattori | | |

FOREIGN PATENT DOCUMENTS

| | | | |
|---|---|---|---|
| JP | 2013174010 A | * | 9/2013 |
| WO | 2013-046644 A1 | | 4/2013 |

OTHER PUBLICATIONS

Ota, "Press Processing Engineering Manual," Jul. 1981, pp. 1-3.
Dec. 1, 2015 Search Report issued in International Patent Application No. PCT/JP2015/074763.

* cited by examiner

BATTERY PACKAGING MATERIAL

TECHNICAL FIELD

The present invention relates to a battery packaging material in which pinholes and cracks are suitably suppressed.

BACKGROUND ART

Various types of batteries have been developed heretofore, and in every battery, a packaging material is an essential member for sealing battery elements such as an electrode and an electrolyte. Metallic packaging materials have been often used heretofore as battery packagings.

On the other hand, in recent years, batteries have been required to be diversified in shape and to be thinned and lightened with improvement of performance of electric cars, hybrid electric cars, personal computers, cameras, mobile phones and so on. However, metallic battery packaging materials that have often been heretofore used have the disadvantage that it is difficult to keep up with diversification in shape, and there is a limit on weight reduction.

Thus, in recent years, there has been proposed a film-shaped laminate with a base material, a metal layer and a sealant layer laminated in this order has been proposed as a battery packaging material which is easily processed into diversified shapes and is capable of achieving thickness reduction and weight reduction. However, such a film-shaped packaging material is thinner as compared to a metallic packaging material, and has the disadvantage that pinholes and cracks are easily generated during molding. If pinholes and cracks are generated in a battery packaging material, an electrolytic solution may permeate to a metal layer to form a metal precipitate, resulting in generation of a short-circuit, and therefore it is absolutely necessary that a film-shaped battery packaging material have a property that makes it hard to generate pinholes during molding, i.e. excellent moldability.

Particularly, in recent years, a battery packaging material has been desired to have a further reduced thickness and weight, and layers that form the battery packaging material after molding have been required to have a further reduced thickness. However, when the thickness of a metal layer decreases to, for example, less than 30 μm, pinholes and cracks are very easily generated in the metal layer during molding of a battery packaging material.

Various studies have been conducted heretofore with attention paid to an adhesive layer for bonding a metal layer in order to improve the moldability of a film-shaped battery packaging material. For example, Patent Document 1 discloses that in a laminated packaging material which includes an inner layer including a resin film; a first adhesive agent layer; a metal layer; a second adhesive agent layer; and an outer layer including a resin film, at least one of the first adhesive agent layer and the second adhesive agent layer is formed of an adhesive agent composition containing a resin having an active hydrogen group on the side chain, a polyfunctional isocyanate and a polyfunctional amine compound to give a packaging material having high reliability in deeper molding.

As represented by Patent Document 1, many studies have been conducted heretofore on techniques for improving moldability with attention paid to blended components of an adhesive layer for bonding a metal layer and another layer in a battery packaging material including a film-shaped laminate, but there have been reported very few techniques for improving moldability with attention paid to the shape etc. of a metal layer after molding.

PRIOR ART DOCUMENTS

Patent Document

Patent Document 1: Japanese Patent Laid-open Publication No. 2008-287971.

Non-Patent Document

Non-Patent Document 1: Akira OTA, "Press Processing Engineering Manual", published by NIKKAN KOGYO SHIMBUN, LTD., issued on 30 Jul. 1981, pages 1 to 3

SUMMARY OF THE INVENTION

Problem to be Solved by the Invention

A main object of the present invention is to provide a battery packaging material formed by molding a sheet-shaped laminate in which at least a base material layer, a metal layer and a sealant layer are laminated in this order, with pinholes and cracks being suitably suppressed after molding.

Means for Solving the Problem

The present inventors have extensively conducted studies for solving the above-mentioned problem. Resultantly, the present inventors have found that in a battery packaging material including a sheet-shaped laminate including at least a base material layer, a metal layer and a sealant layer laminated in this order, when the thickness at each of curved sections forming the corners of the molded metal layer, and the thickness at a section situated between the curved sections satisfy a specific relationship, the ratio of generation of pinholes and cracks can be considerably reduced. The present invention has been completed by further conducting studies based on the above-mentioned findings.

That is, the present invention provides a battery packaging material and a battery of the following aspects.

Item 1. A battery packaging material comprising a sheet-shaped laminate including at least a base material layer, a metal layer and a sealant layer laminated in this order, wherein the battery packaging material is formed so as to protrude from the sealant layer side to the base material layer side, and includes on the sealant layer side a substantially rectangular parallelepiped space which accommodates a battery element, the battery packaging material includes a first curved section and a second curved section in this order from a center portion to an end part of the battery packaging material in a cross-section in the thickness direction on a straight line connecting mutually opposed corners of a portion protruding in a substantially rectangular shape in plan view of the battery packaging material from the base material layer side, and a thickness a of the metal layer at the first curved section, a thickness c of the metal layer at the second curved section, and a thickness b of the metal layer at a section situated between the first curved section and the second curved section satisfy the following relationship:

$$a \geq b > c \text{ or } a \geq c > b.$$

Item 2. The battery packaging material according to item 1, wherein a thickness of the metal layer at the center portion of the portion protruding in a substantially rectangular shape in plan view of the battery packaging material is less than 30 μm.

Item 3. The battery packaging material according to item 1 or 2, wherein the thickness a of the metal layer at the first curved section is less than 30 μm.

Item 4. The battery packaging material according to any one of items 1 to 3, wherein the thickness b of the metal layer at the section situated between the first curved section and the second curved section is less than 30 μm.

Item 5. The battery packaging material according to any one of items 1 to 4, wherein the thickness c of the metal layer at the second curved section is less than 30 μm.

Item 6. The battery packaging material according to any one of items 1 to 5, wherein the metal layer is formed of an aluminum foil.

Item 7. The battery packaging material according to any one of items 1 to 6, wherein an adhesive layer is laminated between the base material layer and the metal layer.

Item 8. A battery comprising a battery element which includes at least a positive electrode, a negative electrode and an electrolyte, the battery element being stored in the battery packaging material according to any one of items 1 to 7.

Advantages of the Invention

In a battery packaging material according to the present invention, the thickness at each of curved sections forming the corners of a molded metal layer, and the thickness at a section situated between the curved sections satisfy a specific relationship, and thus generation of pinholes, cracks and the like in the battery packaging material can be suppressed. Particularly, even when the metal layer has a very small thickness of less than 30 μm, generation of pinholes, cracks and the like in the battery packaging material can be suppressed.

EMBODIMENT OF THE INVENTION

A battery packaging material according to the present invention is a battery packaging material formed by molding a sheet-shaped laminate in which at least a base material layer, a metal layer and a sealant layer are laminated in this order. The battery packaging material is formed so as to protrude from the sealant layer side to the base material layer side, and includes on the sealant layer side a substantially rectangular parallelepiped space which accommodates a battery element. The battery packaging material includes a first curved section and a second curved section in this order from a center portion to an end part of the battery packaging material in a cross-section in the thickness direction on a straight line connecting mutually opposed corners of a portion protruding in a substantially rectangular shape in plan view of the battery packaging material from the base material layer side. The thickness a of the metal layer at the first curved section, the thickness c of the metal layer at the second curved section, and the thickness b of the metal layer at a section situated between the first curved section and the second curved section satisfy the relationship of a≥b>c or a≥c>b. Hereinafter, the battery packaging material according to the present invention will be described in detail.

1. Laminated Structure of Battery Packaging Material

Figure 3:
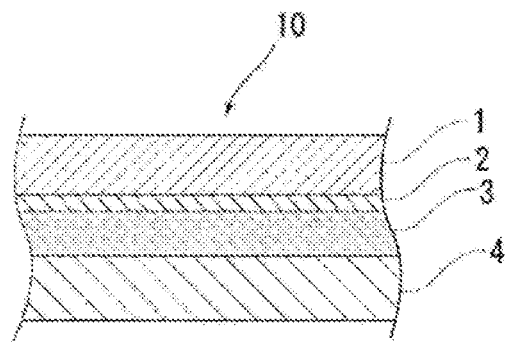
FIG. 3 is a schematic sectional view showing a laminated structure of the battery packaging material according to the present invention.
Figure 4:
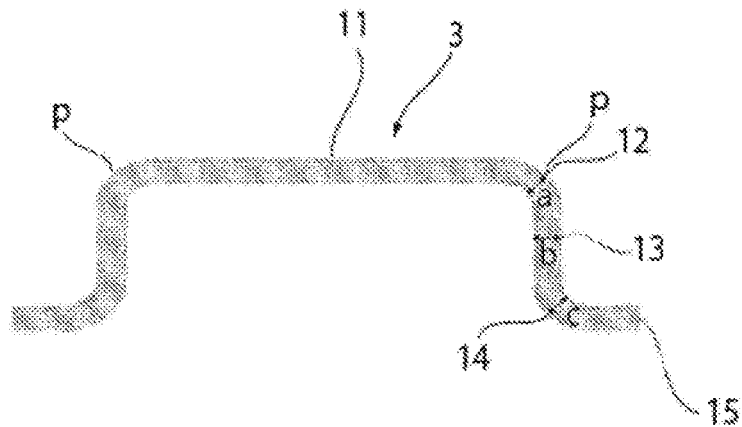
FIG. 4 is a schematic view showing a cross section of a metal layer which is obtained by cutting the battery packaging material in the thickness direction along line A-A' in FIG. 1.

A battery packaging material 10 according to the present invention includes a laminate in which at least a base material layer 1, a metal layer 3 and a sealant layer 4 are laminated in this order as shown in FIG. 3. In the battery packaging material 10 according to the present invention, the base material layer 1 is an outermost layer, and the sealant layer 4 is an innermost layer. That is, at the time of assembling a battery, the sealant layer 4 situated on the periphery of a battery element is heat-welded with itself to hermetically seal the battery element, so that the battery element is encapsulated.

As shown in, for example, FIG. 3, the battery packaging material 10 according to the present invention may be provided with an adhesive layer 2 between the base material layer 1 and the metal layer 3 as necessary in order to improve adhesiveness of these layers. An adhesive layer (not illustrated) may be provided between the metal layer 3 and the sealant 4 as necessary in order to improve adhesiveness of these layers.

2. Shape of Battery Packaging Material

Figure 1:
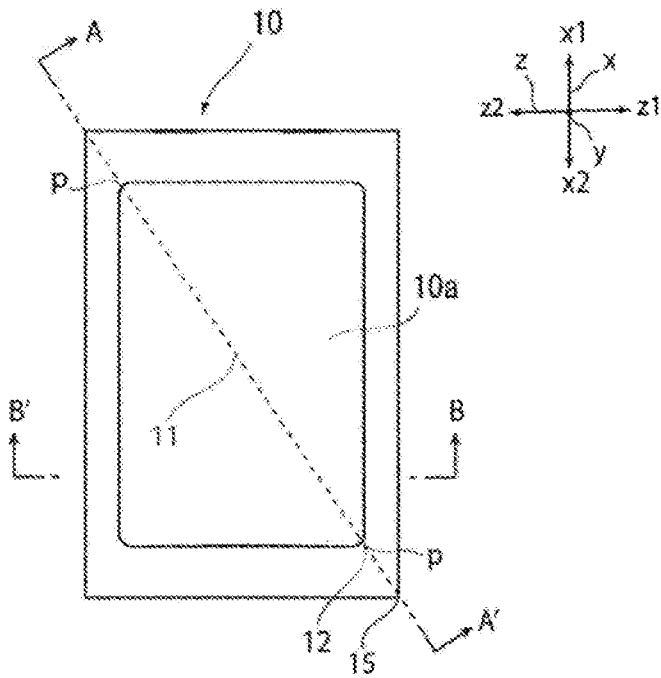
FIG. 1 is a schematic view of a battery packaging material according to the present invention in plan view of the battery packaging material from the base material layer side.
Figure 2:
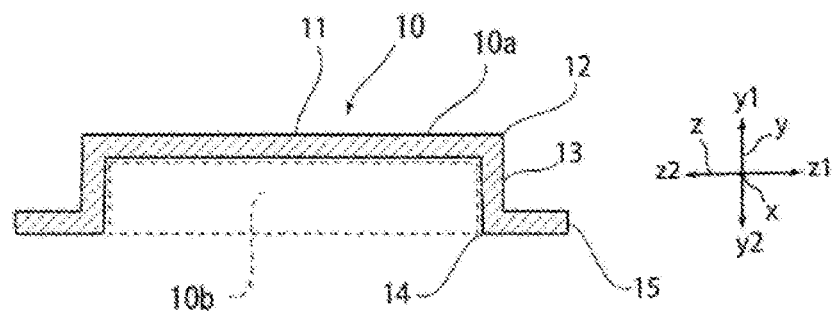
FIG. 2 is a schematic sectional view taken along line B-B' in FIG. 1.

The battery packaging material 10 according to the present invention is formed so as to protrude from the sealant layer 4 side to the base material layer 1 side as shown in FIG. 1 and FIG. 2. Specifically, the battery packaging material 10 according to the present invention is formed so as to protrude from the sealant layer 4 side to the base material layer 1 side by molding a sheet-shaped laminate having the above-mentioned laminated structure. For example, the molding can be performed in the following manner: a straight mold including a substantially rectangular male mold, and a female mold having a clearance from the male mold is provided, the laminate is mounted on the female mold in such a manner that the sealant layer 4 is situated on the male mold side, and the laminate is pressed at a predetermined pressure (surface pressure). By this molding, the battery packaging material 10 according to the present invention is provided with a portion 10a protruding in a substantially rectangular shape in plan view of the battery packaging material 10 from the base material layer 1 side. By the molding, a substantially rectangular parallelepiped space 10b which accommodates a battery element is formed on the sealant layer 4 side in the battery packaging material 10 according to the present invention.

Two battery packaging materials 10 according to the present invention may be provided to accommodate an electronic element in a space with two spaces 10b combined together by heat-welding sealant layers 4 with the sealant layers 4 opposed to each other. The battery packaging material 10 according to the present invention, and a sheet-shaped laminate as described above may be provided to accommodate an electronic element in one space 10b obtained by heat-welding sealant layers 4 with the sealant layers 4 opposed to each other.

In the battery packaging material 10 according to the present invention, the limit molding depth at the molded portion is not particularly limited, but it is preferably 3.0 mm or more, more preferably about 5.0 to 10.0 mm, further preferably about 5.0 to 8.0 mm for effectively suppressing pinholes and cracks caused by molding while reducing the thickness and the weight of the battery packaging material 10. The limit molding depth of the battery packaging material is a value when molding is performed by a method as described in examples.

Figure 5:
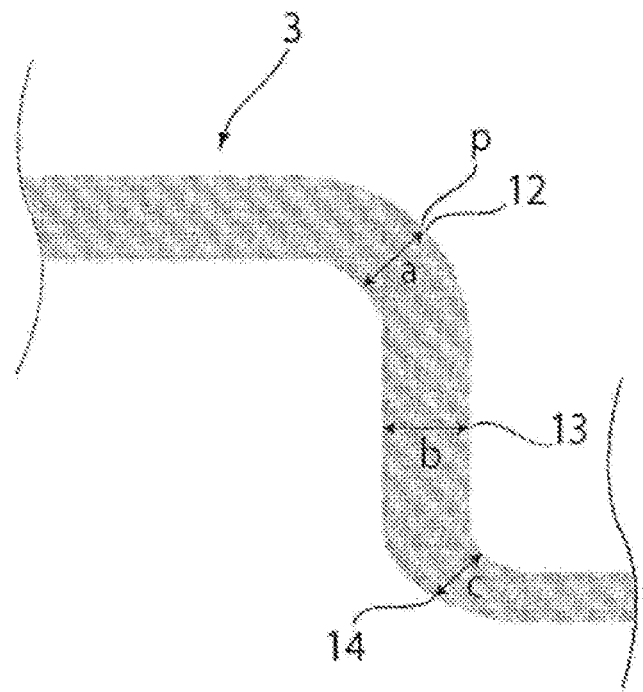
FIG. 5 is an enlarged view where the thickness a, the thickness b and the thickness c of the metal layer satisfy the relationship of a≥b>c in the schematic view showing a cross section of a metal layer which is obtained by cutting the battery packaging material in the thickness direction along line A-A' in FIG. 1.
Figure 6:
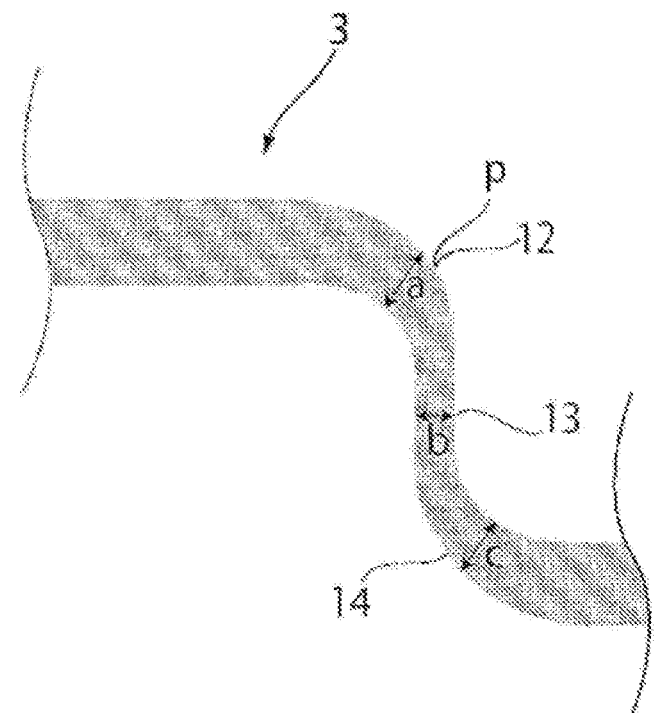
FIG. 6 is an enlarged view where the thickness a, the thickness b and the thickness c of the metal layer satisfy the relationship of a≥c>b in the schematic view showing a cross section of a metal layer which is obtained by cutting the battery packaging material in the thickness direction along line A-A' in FIG. 1.

As shown in, for example, FIG. 2, the battery packaging material 10 according to the present invention includes a first curved section 12 and a second curved section 14 in this order from a center portion 11 to an end part 15 of the battery packaging material 10 in a cross-section in the thickness direction on a straight line A-A' connecting mutually opposed corners p of a portion 10a protruding in a substantially rectangular shape in plan view of the battery packaging material 10 from the base material layer 1 side. Further, in the battery packaging material 10 according to the present invention, the thickness a of the metal layer 3 at the first curved section 12, the thickness c of the metal layer 3 at the second curved section 14, and the thickness b of the metal layer 3 at a section 13 situated between the first curved section 12 and the second curved section 14 satisfy the relationship of a≥b>c or a≥c>b as shown in FIG. 5 or FIG. 6. In the present invention, positions for the thickness a, b and c each correspond to a location at which the curvature radius is the smallest in each curved section formed by molding, and usually means a center portion between the start and the end of the curve.

The present inventors have conducted studies, and resultantly found that when a battery packaging material including a metal layer is molded, in a section where the metal layer is curved, extension of the metal layer increases, so that pinholes and cracks are easily generated, and particularly, at the position of the first curved section, pinholes and cracks are easily generated. That is, it has been found that pinholes and cracks are most easily generated at the corner p (position of the first curved section 12) of the metal layer which is formed by molding.

Figure 7:
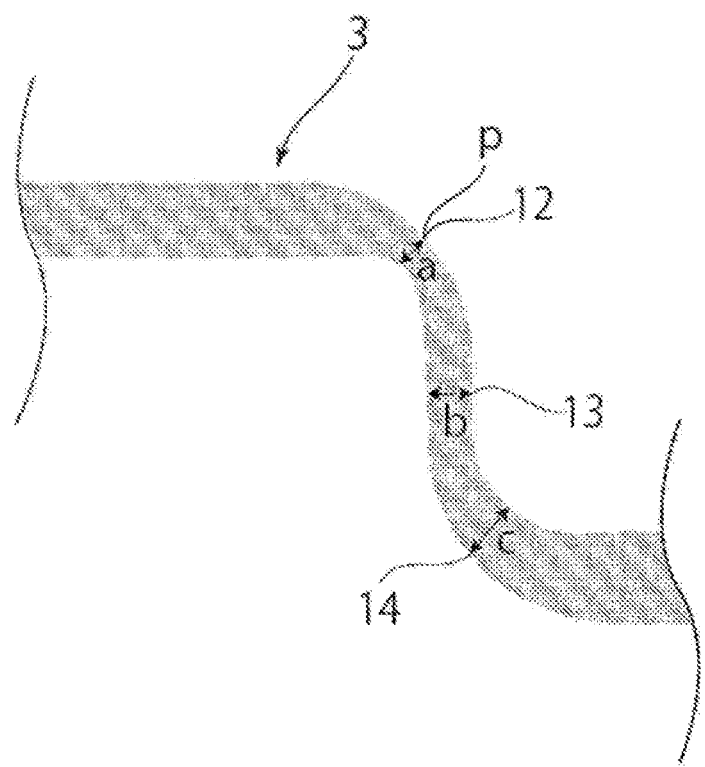
FIG. 7 is an enlarged view where the thickness a, the thickness b and the thickness c of the metal layer satisfy the relationship of c≥b>a in the schematic view showing a cross section of a metal layer which is obtained by cutting the battery packaging material in the thickness direction along line A-A' in FIG. 1.

On the other hand, the battery packaging material 10 according to the present invention is designed so that the thicknesses a, b and c of the metal layer 3 after molding satisfy the specific relationship described above, and therefore generation of pinholes and cracks is effectively suppressed. That is, the battery packaging material 10 according to the present invention is designed so that the thickness a of the metal layer 3 is the largest after molding, and therefore pinholes and cracks are suitably suppressed. On the other hand, for example, when the thicknesses a, b and c satisfy the relationship of c≥b>a as shown in FIG. 7, pinholes and cracks are easily generated.

The method for designing the battery packaging material 10 according to the present invention so that the thicknesses a, b and c of the metal layer 3 after molding satisfy the specific relationship described above is not particularly limited, and for example, the material of the metal layer 3, rolling conditions and the like can be adjusted to design the battery packaging material 10 so that the thicknesses a, b and c of the metal layer 3 after molding satisfy the specific relationship described above. A specific method is as described later in detail in the section [Metal Layer 3].

3. Composition of Each Layer Forming Battery Packaging Material

[Base Material Layer 1]

In the battery packaging material 10 according to the present invention, the base material layer 1 is a layer situated as an outermost layer. The material that forms the base material layer 1 is not particularly limited as long as it has insulation quality. Examples of the material that forms the base material layer 1 include polyesters, polyamides, epoxy resins, acrylic resins, fluororesins, polyurethanes, silicon resins, phenol resins, polyether imides, polyimides, and mixtures and copolymers thereof.

Specific examples of the polyester include polyethylene terephthalate, polybutylene terephthalate, polyethylene naphthalate, polybutylene naphthalate, polyethylene isophthalate, polycarbonate, copolymerization polyesters with ethylene terephthalate as a main repeating unit, and copolymerization polyesters with a butylene terephthalate as a main repeating unit. Specific examples of the copolymerization polyester including ethylene terephthalate as a main repeating unit include copolymer polyesters that are polymerized with ethylene isophthalate and include ethylene terephthalate as a main repeating unit (hereinafter, abbreviated as follows after polyethylene(terephthalate/isophthalate)), polyethylene(terephthalate/isophthalate), polyethylene(terephthalate/adipate), polyethylene(terephthalate/sodium sulfoisophthalate), polyethylene(terephthalate/sodium isophthalate), polyethylene (terephthalate/phenyldicarboxylate) and polyethylene(terephthalate/decane dicarboxylate). Specific examples of the copolymerization polyester with butylene terephthalate as a main repeating unit include copolymer polyesters that are polymerized with butylene isophthalate and include butylene terephthalate as a main repeating unit (hereinafter, abbreviated as follows after polybutylene(terephthalate/isophthalate)), polybutylene(terephthalate/adipate), polybutylene(terephthalate/sebacate), polybutylene(terephthalate/decane dicarboxylate) and polybutylene naphthalate. These polyesters may be used alone, or may be used in combination of two or more thereof. A polyester has the advantage that is excellent in electrolytic solution resistance, so that whitening etc. due to deposition of an electrolytic solution is hard to occur, and thus the polyester is suitably used as a material for formation of the base material layer 1.

Specific examples of the polyamide include aliphatic polyamides such as nylon 6, nylon 66, nylon 610, nylon 12, nylon 46, and copolymers of nylon 6 and nylon 6,6; hexamethylenediamine-isophthalic acid-terephthalic acid copolymerization polyamides containing a structural unit derived from terephthalic acid and/or isophthalic acid, such as nylon 6I, nylon 6T, nylon 6IT and nylon 6I6T (I denotes isophthalic acid and T denotes terephthalic acid), and polyamides containing aromatics, such as polymethaxylylene adipamide (MXD6); cycloaliphatic polyamides such as polyaminomethyl cyclohexyl adipamide (PACM 6); polyamides copolymerized with a lactam component or an isocyanate component such as 4,4'-diphenylmethane-diisocyanate, and polyester amide copolymers and polyether ester amide copolymers as copolymers of a copolymerization polyamide and a polyester or a polyalkylene ether glycol; and copolymers thereof. These polyamides may be used alone, or may be used in combination of two or more thereof. A stretched polyamide film is excellent in stretchability, can prevent occurrence of whitening due to resin breakage in the base material layer 1 during molding, and is thus suitably used as a material for formation of the base material layer 1.

The base material layer 1 may be formed of a uniaxially or biaxially stretched resin film, or may be formed of an unstretched resin film. Among them, a uniaxially or biaxially stretched resin film, particularly a biaxially stretched resin film has improved heat resistance through orientation and crystallization, and is therefore suitably used as the base material layer 1. The base material layer 1 may be formed by coating the top of the metal layer 3 with the above-mentioned material.

Among them, nylons and polyesters are preferred, and biaxially stretched nylons and biaxially stretched polyesters are further preferred, with biaxially stretched nylons being especially preferred, as resin films for formation of the base material layer 1.

The base material layer 1 can also be laminated with at least one of a resin film and a coating which is made of a different material for improving pinhole resistance, and insulation quality as a package of a battery. Specific examples include a multilayer structure in which a polyester film and a nylon film are laminated, and a multilayer structure in which a biaxially stretched polyester and a biaxially stretched nylon are laminated. When the base material layer 1 is made to have a multilayer structure, the resin films may be bonded with the use of an adhesive, or may be directly laminated without the use of an adhesive. Examples of the method for bonding the resin films without the use of an adhesive include methods in which the resin films are bonded in a heat-melted state, such as a co-extrusion method, a sand lamination method and a thermal lamination method. When the resin films are bonded with the use of an adhesive, the adhesive to be used may be a two-liquid curable adhesive, or may be a one-liquid curable adhesive. Further, the adhesion mechanism of the adhesive is not particularly limited, and may be any one of a chemical reaction type, a solvent volatilization type, a heat melting type, a heat pressing type, an electron beam curing type such as that of UV or EB, and so on. Examples of the component of the adhesive include polyester-based resins, polyether-based resins, polyurethane-based resins, epoxy-based resins, phenol resin-based resins, polyamide-based resins, polyolefin-based resins, polyvinyl acetate-based resins, cellulose-based resins, (meth)acryl-based resins, polyimide-based resins, amino resins, rubbers and silicone-based resins.

The thickness of the base material layer 1 is, for example, about 10 to 50 μm, preferably 15 to 30 μm.

[Adhesive Layer 2]

In the battery packaging material 10 according to the present invention, the adhesive layer 2 is a layer provided between the base material layer 1 and the metal layer 3 for strongly bonding these layers to each other.

The adhesive layer 2 is formed from an adhesive capable of bonding the base material layer 1 and the metal layer 3. The adhesive used for forming the adhesive layer 2 may be a two-liquid curable adhesive, or may be a one-liquid curable adhesive. Further, the adhesion mechanism of the adhesive used for forming the adhesive layer 2 is not particularly limited, and may be any one of a chemical reaction type, a solvent volatilization type, a heat melting type, a heat pressing type and so on.

Specific examples of the adhesive component that can be sued for forming the adhesive layer 2 include polyester-based resins such as polyethylene terephthalate, polybutylene terephthalate, polyethylene naphthalate, polybutylene naphthalate, polyethylene isophthalate, polycarbonate, and copolymerized polyester, polyether-based adhesive agents; polyurethane-based adhesive agents; epoxy-based resins; phenol resin-based resins; polyamide-based resins such as nylon 6, nylon 66, nylon 12 and copolymerized polyamide; polyolefin-based resins such as polyolefins, carboxylic acid-modified polyolefins and metal-modified polyolefins, polyvinyl acetate-based resins; cellulose-based adhesive agents; (meth)acryl-based resins; polyimide-based resins; amino resins such as urea resins and melamine resins; rubbers such as chloroprene rubber, nitrile rubber and styrene-butadiene rubber; and silicone-based resins. These adhesive components may be used alone, or may be used in combination of two or more thereof. Among these adhesive components, polyurethane-based adhesives are preferred.

The thickness of the adhesive layer 2 is, for example, about 1 to 10 μm, preferably about 2 to 5 μm.

[Metal Layer 3]

In the battery packaging material 10 according to the present invention, the metal layer 3 is a layer which is intended to improve the strength of the battery packaging material 10, and also functions as a barrier layer for preventing ingress of water vapor, oxygen, light and the like into the battery. As described above, in the present invention, the thickness a of the metal layer 3 at the first curved section 12, the thickness c of the metal layer 3 at the second curved section 14, and the thickness b of the metal layer 3 at a section 13 situated between the first curved section 12 and the second curved section 14 satisfy the relationship of a≥b>c or a≥c>b as shown in FIG. 5 or FIG. 6. The battery packaging material 10 according to the present invention has a configuration as described above, and thus even when the metal layer 3 has a very small thickness of, for example, less than 30 μm, pinholes and cracks are suitably suppressed.

In the present invention, generation of pinholes and cracks in the metal layer 3 is suitably suppressed by ensuring that the thickness a of the metal layer 3 at the first curved section 12 is the largest, and this applies to both the cases where the curvature radius in each curved section is small and where the curvature radius in each curved section is large. That is, for example, in both the cases where the curvature radius is small and thus cracks are easily generated and where the curvature radius is large and thus cracks are hardly generated, cracks etc. are more effectively suppressed when the thickness a is the largest than when the thickness a is not the larges in comparison at the same curvature radius, and this tendency remains even when the curvature radius changes.

The thickness a of the metal layer 3 at the first curved section 12 is not particularly limited as long as the above-mentioned relationship is satisfied, but it is preferably less than 30 μm, more preferably about 5 to 28 μm, further preferably about 10 to 25 μm, especially preferably about 15 to 20 μm for effectively suppressing pinholes and cracks caused by molding while reducing the thickness and the weight of the battery packaging material 10.

The thickness c of the metal layer 3 at the second curved section 14 is not particularly limited as long as the above-mentioned relationship is satisfied, but it is preferably less than 30 µm, more preferably about 5 to 28 µm, still more preferably about 10 to 25 µm, further preferably about 15 to 20 µm for effectively suppressing pinholes and cracks caused by molding while reducing the thickness and the weight of the battery packaging material 10.

The thickness b of the metal layer 3 at the section situated between the first curved section 12 and the second curved section 14 is not particularly limited as long as the above-mentioned relationship is satisfied, but it is preferably less than 30 µm, more preferably about 5 to 28 µm, further preferably about 10 to 25 µm, especially preferably about 15 to 20 µm for effectively suppressing pinholes and cracks caused by molding while reducing the thickness and the weight of the battery packaging material 10.

The thickness of the metal layer 3 in the battery packaging material 10 according the present invention is measured in the following manner: the battery packaging material 10 is divided into two parts by cutting the battery packaging material 10 in the thickness direction with a microtome, on the straight line A-A' connecting mutually opposed corners p of the portion 10a protruding in a substantially rectangular shape in plan view of the battery packaging material 10 from the base material layer 1 side, and the obtained cross-section is observed with a laser microscope. Specifically, the thickness of the metal layer 3 is measured by a method as described in examples. It is desirable that for preventing a change in shape of the battery packaging material during cutting of the battery packaging material with a microtome and during observation of the cross-section, the battery packaging material after molding be fixed with a resin etc., followed by cutting the battery packaging material and measuring the thickness.

Specific examples of the metal forming the metal layer 3 include aluminum, stainless steel and titanium, with aluminum and stainless steel being preferred. The metal layer 3 can be formed from a metal foil or by metal deposition, and is preferably formed from a metal foil, more preferably from an aluminum foil or a stainless steel foil. For preventing generation of pinholes in the metal layer 3, it is more preferred to form the metal layer 3 from, for example, a soft aluminum foil such as annealed aluminum (JIS A8021P-O, JIS A8079P-O), or a stainless steel foil such as A3004 or SUS304. However, since the thicknesses a, b and c vary depending not only on a composition of a material that forms the metal layer, such as an aluminum alloy or stainless steel, but also on a method for processing the metal layer, the thickness relationship is not satisfied based only on a composition as specified in, for example, JIS. A method for setting the thickness a, b and c of the metal layer 3 in the battery packaging material 10 after molding so as to satisfy the relationship in the present invention will be described below by taking an Al—Fe-based aluminum foil as an example. Even when another aluminum foil or stainless steel is used, a method based on the following method can be employed.

(Example of Method for Forming Al—Fe-Based Aluminum Foil)

An Al—Fe-based aluminum foil which ensures that the thicknesses a, b and c of the metal layer 3 in the battery packaging material 10 after molding satisfy the relationship in the present invention can be produced by carrying out the steps of melting-casting, slabbing, surface cutting, homogenization (homogenization treatment), hot rolling, cold rolling, intermediate annealing, cold rolling, foil rolling and final annealing. In the melting step and the casting step, for example, JIS Standard A8079H-O is melted to prepare an ingot. In the hot rolling step, the alloy material after the homogenization treatment is rolled at a high temperature. The hot rolling temperature of the alloy material in this step is preferably 280 to 300° C. Subsequently, in the cold rolling step, the alloy material subjected to hot rolling is cold-rolled to be thinly extended. The cold rolling temperature of the alloy material in this step is preferably 110 to 240° C. For example, by adjusting the cold rolling temperature, the thicknesses a, b and c after molding of the battery packaging material can be adjusted. Further, in the intermediate annealing step, strain in the alloy material after cold rolling is removed by a heat treatment, so that the structure is softened to improve ductility. The treatment temperature in this step is preferably 380 to 400° C., especially preferably 390° C. The treatment time is preferably 1.5 to 2.5 hours. For example, by adjusting the treatment time, the thicknesses a, b and c after molding of the battery packaging material can be adjusted.

The thickness of the metal layer 3 is not particularly limited as long as the metal layer 3 has the above-mentioned properties, but for example, the thickness of the metal layer 3 at the center portion 11 of the portion 10a protruding in a substantially rectangular shape in plan view of the battery packaging material 10 is preferably less than 30 µm, more preferably about 20 to 28 µm, further preferably about 20 to 25 µm, especially preferably about 15 to 20 µm. In the battery packaging material 10, the thickness of the metal layer 3 at the center portion 11 does not substantially change before and after molding.

At least one surface, preferably both surfaces, of the metal layer 3 are subjected to a chemical conversion treatment for stabilization of bonding, prevention of dissolution and corrosion, and so on. Here, the chemical conversion treatment is a treatment for forming an acid resistance film on the surface of the metal layer. Examples of the chemical conversion treatment include a chromic acid chromate treatment using a chromic acid compound such as chromium nitrate, chromium fluoride, chromium sulfate, chromium acetate, chromium oxalate, chromium biphosphate, acetylacetate chromate, chromium chloride or chromium potassium sulfate; a phosphoric acid chromate treatment using a phosphoric acid compound such as sodium phosphate, potassium phosphate, ammonium phosphate or polyphosphoric acid; and a chromate treatment using an aminated phenol polymer having repeating units represented by the following general formulae (1) to (4).

[Chemical Formula 1]

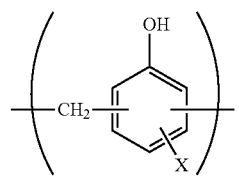

(1)

[Chemical Formula 2]

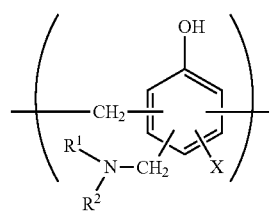

(2)

-continued

[Chemical Formula 3]

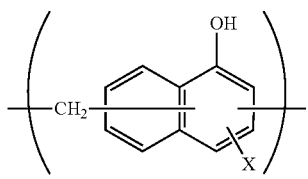

(3)

[Chemical Formula 4]

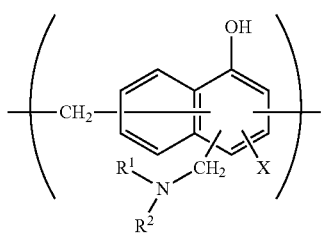

(4)

In the general formulae (1) to (4), X represents a hydrogen atom, a hydroxyl group, an alkyl group, a hydroxyalkyl group, an allyl group or a benzyl group. $R^1$ and $R^2$ are the same or different, and each represent a hydroxyl group, an alkyl group or a hydroxyalkyl group. In the general formulae (1) to (4), examples of the alkyl group represented by X, $R^1$ and $R^2$ include linear or branched alkyl groups with a carbon number of 1 to 4, such as a methyl group, an ethyl group, a n-propyl group, an isopropyl group, a n-butyl group, an isobutyl group and a tert-butyl group. Examples of the hydroxyalkyl group represented by X, $R^1$ and $R^2$ include linear or branched alkyl groups with a carbon number of 1 to 4, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group and a 4-hydroxybutyl group. In the general formulae (1) to (4), the alkyl group and the hydroxyalkyl group represented by X, $R^1$ and $R^2$ may be the same or different. In the general formulae (1) to (4), X is preferably a hydrogen atom, a hydroxyl group or a hydroxyalkyl group. A number average molecular weight of the aminated phenol polymer having repeating units represented by the general formulae (1) to (4) is preferably about 500 to 1000000, and more preferably about 1000 to 20000, for example.

Examples of the chemical conversion treatment method for imparting corrosion resistance to the metal layer 3 include a method in which the metal layer 3 is coated with a dispersion of fine particles of a metal oxide such as aluminum oxide, titanium oxide, cerium oxide or tin oxide or barium sulfate in phosphoric acid, and annealed at 150° C. or higher to form corrosion resistance treatment layer on the surface of the metal layer 3. A resin layer with a cationic polymer crosslinked with a crosslinking agent may be further formed on the corrosion resistance treatment layer. Here, examples of the cationic polymer include polyethyleneimine, ion polymer complexes formed of a polymer having polyethyleneimine and a carboxylic acid, primary amine-grafted acrylic resins obtained by graft-polymerizing a primary amine with an acrylic main backbone, polyallylamine or derivatives thereof, and aminophenol. These cationic polymers may be used alone, or may be used in combination of two or more thereof. Examples of the crosslinking agent include compounds having at least one functional group selected from the group consisting of an isocyanate group, a glycidyl group, a carboxyl group and an oxazoline group, and silane coupling agents. These crosslinking agents may be used alone, or may be used in combination of two or more thereof.

As for the chemical conversion treatment, only one chemical conversion treatment may be conducted, or combination of two or more chemical conversion treatments may be conducted. The chemical conversion treatments may be performed using one compound alone, or may be performed using two or more compounds in combination. Among chemical conversion treatments, a chromic acid chromate treatment, a chromate treatment using a chromic acid compound, a phosphoric acid compound and an aminated phenol polymer in combination, and so on are preferred.

The amount of the acid resistance film to be formed on the surface of the metal layer 3 in the chemical conversion treatment is not particularly limited, but for example, with the above-mentioned chromate treatment is performed, it is desirable that the chromic acid compound be contained in an amount of about 0.5 mg to about 50 mg, preferably about 1.0 mg to about 40 mg, in terms of chromium, the phosphorus compound to be contained in an amount of about 0.5 mg to about 50 mg, preferably about 1.0 mg to about 40 mg, in terms of phosphorus, and the aminated phenol polymer be contained in an amount of about 1 mg to 200 mg, preferably about 5.0 mg to 150 mg, per 1 $m^2$ of the surface of the metal layer 3.

The chemical conversion treatment is performed in the following manner: a solution containing a compound to be used for formation of an acid resistance film is applied onto the surface of the metal layer by a bar coating method, a roll coating method, a gravure coating method, an immersion method or the like, and heating is then performed so that the temperature of the metal layer is about 70° C. to 200° C. The metal layer may be subjected to a degreasing treatment by an alkali immersion method, an electrolytic cleaning method, an acid cleaning method, an electrolytic acid cleaning method or the like before the metal layer is subjected to a chemical conversion treatment. When a degreasing treatment is performed as described above, the chemical conversion treatment of the surface of the metal layer can be further efficiently performed.

[Sealant Layer 4]

In the battery packaging material 10 according to the present invention, the sealant layer 4 corresponds to an innermost layer, and at the time of assembling a battery, the sealant layers are heat-welded with each other to hermetically seal the battery element.

The resin component to be used in the sealant layer 4 is not particularly limited as long as it can be heat-welded, and examples thereof include polyolefins, cyclic polyolefins, carboxylic acid-modified polyolefins and carboxylic acid-modified cyclic polyolefins.

Specific examples of the polyolefin include polyethylene such as low-density polyethylene, medium-density polyethylene, high-density polyethylene and linear low-density polyethylene; polypropylene such as homopolypropylene, block copolymers of polypropylene (e.g. block copolymers of propylene and ethylene) and random copolymers of polypropylene (e.g. random copolymers of propylene and ethylene); terpolymers of ethylene-butene-propylene; and the like. Among these polyolefins, polyethylene and polypropylene are preferred.

The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene and norbornadiene. Among these polyolefins, cyclic alkenes are preferred, and norbornene is further preferred.

The carboxylic acid-modified polyolefin is a polymer with the polyolefin modified by subjecting the polyolefin to block polymerization or graft polymerization with a carboxylic acid. Examples of the carboxylic acid to be used for modification include maleic acid, acrylic acid, itaconic acid, crotonic acid, maleic anhydride and itaconic anhydride.

The carboxylic acid-modified cyclic polyolefin is a polymer obtained by performing copolymerization with an α,β-unsaturated carboxylic acid or an anhydride thereof replacing a part of monomers that form the cyclic polyolefin, or by block-polymerizing or graft-polymerizing an α,β-unsaturated carboxylic acid or an anhydride thereof with the cyclic polyolefin. The cyclic polyolefin to be modified with a carboxylic acid is the same as described above. The carboxylic acid to be used for modification is the same as that used for modification of the acid-modified cycloolefin copolymer.

Among these resin components, carboxylic acid-modified polyolefins are preferred, and carboxylic acid-modified polypropylene is further preferred.

The sealant layer 4 may be formed from one resin component alone, or may be formed from a blend polymer obtained by combining two or more resin components. Further, the sealant layer 4 may include only one layer, or two or more layers formed of the same resin component or different resin components.

The thickness of the sealant layer 4 may be appropriately selected, and it is about 10 to 100 μm, preferably about 15 to 50 μm.

[Adhesive Layer]

In the battery packaging material 10 according to the present invention, the adhesive layer is a layer that is provided between the metal layer 3 and the sealant layer 4 as necessary for strongly bonding these layers to each other.

The adhesive layer is formed from an adhesive capable of bonding the metal layer 3 and the sealant layer 4 to each other. The bonding mechanism, the kind of the adhesive agent component, and so on for the adhesive layer to be used for formation of the adhesive layer are the same as those for the adhesive layer 2. The adhesive component to be used in the adhesive layer is preferably a polyolefin-based resin, further preferably a carboxylic acid-modified polyolefin, especially preferably carboxylic acid-modified polypropylene.

The thickness of the adhesive layer is, for example, 2 to 50 μm, preferably 20 to 30 μm.

4. Method for Producing Battery Packaging Material

While the method for producing the battery packaging material 10 according to the present invention is not particularly limited as long as the thickness a, b and c of the metal layer 3 satisfy the relationship of a≥b>c or a≥c>b after the laminate in which layers each having a predetermined composition are laminated is obtained, for example the following method is shown as an example.

First, a laminate in which the base material layer 1, the adhesive layer 2 and the metal layer 3 are laminated in this order (hereinafter, the laminate may be described as a "laminate A") is formed. Specifically, the laminate A can be formed by a dry lamination method in which an adhesive agent to be used for formation of the adhesive layer 2 is applied onto the base material layer 1 or the metal layer 3 the surface of which is subjected to a chemical conversion treatment as necessary, using a coating method such as an extrusion method, a gravure coating method or a roll coating method, and dried, the metal layer 3 or the base material layer 1 is then laminated, and the adhesive layer 2 is cured.

Then, the sealant layer 4 is laminated on the metal layer 3 of the laminate A. When the sealant layer 4 is laminated directly on the metal layer 3, a resin component that forms the sealant layer 4 may be applied onto the metal layer 3 of the laminate A by a method such as a gravure coating method or a roll coating method. When an adhesive layer is provided between the metal layer 3 and the sealant layer 4, it is provided, for example, by (1) a method in which the adhesive layer and the sealant layer 4 are co-extruded to be laminated on the metal layer 3 of the laminate A (co-extrusion lamination method); (2) a method in which the adhesive layer and the sealant layer 4 are laminated to form a laminate separately, and the laminate is laminated on the metal layer 3 of the laminate A by a thermal lamination method; (3) a method in which an adhesive agent for formation of the adhesive layer is laminated on the metal layer 3 of the laminate A by, for example, a method of applying the adhesive agent onto the metal layer 3 with an extrusion method or solution coating, drying at a high temperature and baking, and the sealant layer 4 formed in a sheet shape beforehand is laminated on the adhesive layer by a thermal lamination method; and (4) a method in which the melted adhesive layer is poured between the metal layer 3 of the laminate A and the sealant layer 4 formed in a sheet shape beforehand, and simultaneously the laminate A and the sealant layer 4 are bonded together with the adhesive layer interposed therebetween (sandwich lamination method).

A laminate including the base material layer 1, the adhesive layer 2, the metal layer 3, the surface of which is subjected to a chemical conversion treatment as necessary, the adhesive layer provided as necessary and the sealant layer 4 in this order is formed in the manner described above, and the laminate may be further subjected to a heating treatment of hot roll contact type, hot air type, near- or far-infrared type, or the like for strengthening the adhesiveness of the adhesive layer 2 and the adhesive layer provided as necessary. As conditions for such a heating treatment, for example, the temperature is 150 to 250° C., and the time is 1 to 5 minutes.

By molding the laminate obtained as described above, the battery packaging material 10 according to the present invention is obtained. Specifically, the battery packaging material 10 according to the present invention is formed by molding the sheet-like laminate having the above-mentioned laminated structure so as to protrude the laminate from the sealant layer 4 side to the base material layer 1 side. In molding, for example, a straight mold including a substantially rectangular male mold, and a female mold having a clearance (usually about 0.5 to 2.0 mm) from the male mold is provided, the laminate is mounted on the female mold in such a manner that the sealant layer is situated on the male mold side, and the laminate is pressed at a predetermined pressure (surface pressure) to perform molding. By this molding, the battery packaging material 10 is provided with a portion 10a protruding in a substantially rectangular shape in plan view of the battery packaging material 10 from the base material layer 1 side. By the molding, a substantially rectangular parallelepiped space 10b which accommodates a battery element is formed on the sealant layer 4 side in the battery packaging material 10 according to the present invention.

In the battery packaging material 10 according to the present invention, the layers that form the laminate may be subjected to a surface activation treatment such as a corona treatment, a blast treatment, an oxidation treatment or an ozone treatment as necessary for improving or stabilizing film formability, lamination processing and second processing (pouching and embossing molding) suitability, and the like.

5. Use of Battery Packaging Material

The battery packaging material 10 according to the present invention is used as a packaging material for hermetically sealing and storing battery elements such as a positive electrode, a negative electrode and an electrolyte.

Specifically, a battery element including at least a positive electrode, a negative electrode and an electrolyte is covered with the battery packaging material 10 according to the present invention such that a flange portion (region where a sealant layer is in contact with itself) can be formed on the periphery of the battery element while a metal terminal connected to each of the positive electrode and the negative electrode protrudes to the outside, and the sealant layer 4 at the flange portion is heat-sealed with itself, thereby providing a battery using the battery packaging material 10. When the battery element is stored using the battery packaging material 10 according to the present invention, the battery packaging material 10 according to the present invention is used such that the sealant layer 4 is on the inner side (surface in contact with the battery element).

As described above, two battery packaging materials 10 according to the present invention may be provided to accommodate an electronic element in a space with two spaces 10b combined together by heat-welding sealant layers 4 with the sealant layers 4 opposed to each other. The battery packaging material 10 according to the present invention, and a sheet-shaped laminate as described above may be provided to accommodate an electronic element in one space 10b obtained by heat-welding sealant layers 4 with the sealant layers 4 opposed to each other.

The battery packaging material 10 according to the present invention may be used for either a primary battery or a secondary battery, but is preferably used for a secondary battery. The type of secondary battery to which the battery packaging material 10 according to the present invention is applied is not particularly limited, and examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Among these secondary batteries, preferred subjects to which the battery packaging material 10 according to the present invention is applied include lithium ion batteries and lithium ion polymer batteries.

EXAMPLES

The present invention will be described in detail below by showing examples and comparative examples. It is to be noted that the present invention is not limited to the examples.

<Production of Battery Packaging Material>

A battery packaging material 10 including a laminate with a base material layer 1, an adhesive layer 2, a metal layer 3 and a sealant layer 4 laminated in this order was produced by laminating the sealant layer 4 by a thermal lamination method to a laminate with the base material layer 1, the adhesive layer 2 and the metal layer 3 laminated in this order. Specific conditions for producing the battery packaging material are as shown below.

In Examples 1 to 18 and Comparative Examples 1 to 9, as a resin film (thickness of 25 µm, or thickness of 12 µm and 15 µm for PET and nylon, respectively) for forming the base material layer 1, and the metal layer 2 (aluminum foils A to C having a thickness as described in Table 1), those described in Table 1 were used. Details of the aluminum foils A to C are as described later. The aluminum foils A to C were each subjected to a chemical conversion treatment by applying a treatment solution composed of a phenol resin, a chromium fluoride compound (trivalent) and phosphoric acid in an amount of 10 mg/m² (dry weight) on both surfaces of the metal layer by a roll coating method, and baking the film for 20 seconds under the condition that the film temperature was 180° C. or higher.

First, a laminate with the base material layer 1, the adhesive layer 2 and the metal layer 3 laminated in this order was prepared. Specifically, the adhesive layer 2 composed of a two-liquid urethane adhesive agent including a polyester-based main agent and an isocyanate-based curing agent was formed in a thickness of 3 µm on one surface of the base material layer 1, and bonded to a chemically converted surface of the metal layer 3 by pressurization and heating to prepare a laminate with the base material layer 1, the adhesive layer 2 and the metal layer 3 laminated in this order.

Separately, the sealant layer 4 composed of a two-layer co-extruded film having a configuration as described in Table 1 was provided. Each sealant layer 4 was a two-layer co-extruded film obtained by co-extruding a resin layer for forming a part on the metal layer side and a resin layer for forming a part on the innermost layer side. In Table 1, the thickness of acid-modified PP (unsaturated carboxylic acid graft-modified random polypropylene graft-modified with unsaturated carboxylic acid) is 20 µm, the thickness of PP (polypropylene (random copolymer)) is 15 µm, the thickness of acid-modified PE (unsaturated carboxylic acid graft-modified random polyethylene graft-modified with unsaturated carboxylic acid) is 20 µm, and the thickness of PE (polyethylene (random copolymer)) is 15 µm.

The prepared two-layer co-extruded film was then superimposed on the prepared laminate including the base material layer 1, the adhesive layer 2 and the metal layer 3 in such a manner that the resin layer for forming a part on the metal layer side in the two-layer co-extruded film was in contact with the metal layer of the laminate, and thermal lamination was performed by applying heat so that the temperature of the metal layer 3 was 120° C., thereby obtaining a laminate with the base material layer 1, the adhesive layer 2, the metal layer 3 and the sealant layer 4 laminated in this order. The obtained laminate was temporarily cooled, then heated to 180° C., and held at this temperature of 1 minute to be heat-treated, thereby obtaining the battery packaging material 10 in each of Examples 1 to 18 and Comparative Examples 1 to 6.

<Aluminum Foil A>

The aluminum foil A was obtained by rolling an aluminum foil A8021 manufactured by Toyo Aluminium K.K. The aluminum foil was rolled at 290° C. in a hot rolling step, then rolled at a cold rolling temperature of 200° C. in a cold rolling step, and treated at 390° C. for 2.5 hours in an intermediate annealing step. For the aluminum foil A, it is considered that since the cold rolling temperature was set to 200° C., the alloy material was kept uniform by a slow cooling effect, and the treatment time in the intermediate annealing step was set to 2.5 hours, strain in the alloy material was relaxed, so that ductility during molding was influenced.

<Aluminum Foil B>

The aluminum foil B was obtained by rolling an aluminum foil A8021 manufactured by Toyo Aluminium K.K. the aluminum foil was rolled at 290° C. in a hot rolling step, then rolled at a cold rolling temperature of 200° C. in a cold rolling step, and treated at 390° C. for 1.5 hours in an intermediate annealing step. For the aluminum foil B, it is considered that since the treatment time in the intermediate annealing step was set to 1.5 hours, a change occurred in strain in the alloy material, so that ductility during molding was influenced.

<Aluminum Foil C>

The aluminum foil C was obtained by rolling an aluminum foil A8021 manufactured by Toyo Aluminium K.K. The aluminum foil was rolled at 290° C. in a hot rolling step, then rolled at a cold rolling temperature of 100° C. in a cold rolling step, and treated at 390° C. for 1.5 hours in an intermediate annealing step. For the aluminum foil C, it is considered that since the cold rolling temperature was 100° C., a change occurred in uniformity in the alloy material, so that ductility during molding was influenced.

<Evaluation of Moldability>

The battery packaging material 10 obtained in each of Examples 1 to 18 and Comparative Examples 1 to 9 was cut to prepare a strip piece of 120×80 mm, and the strip piece was used as a test sample. A straight mold including a rectangular male mold of 30×50 mm, and a female mold with a clearance of 0.5 mm from the male mold was prepared, the test sample was placed on the female mold in such a manner that the sealant layer was situated on the male mold side, the test sample was pressed at a pressing pressure (surface pressure) of 0.1 MPa, and cold molding (draw-in one-step molding) was performed. The molding depth was changed in units of 0.5 mm, and at each molding depth, presence/absence of pinholes and cracks in the metal layer was checked for ten test samples. The molding depth at which none of the ten test samples had wrinkles, pinholes and cracks was defined as a limit molding depth, and moldability was evaluated in accordance with the following criteria. The results are shown in Table 1.

○: the limit molding depth is 6.0 mm or more.
Δ: the limit molding depth is 4.0 mm to 5.5 mm.
x: the limit molding depth is 3.5 mm or less.

<Measurement of Thickness of Metal Layer After Molding at Limit Molding Depth of 3.0 Mm>

In the same manner as in the above-described evaluation of moldability, a sample prepared from the battery packaging material 10 in each of Examples 1 to 18 and Comparative Examples 1 to 9 was molded at a limit molding depth of 3.0 mm. Next, the battery packaging material 10 after molding was divided into two parts by cutting the battery packaging material 10 in the thickness direction with a microtome (REM-710 RETRATOME manufactured by YAMATO KOHKI INDUSTRIAL CO., LTD.), on a straight line connecting mutually opposed corners p of a portion 10a protruding in a substantially rectangular shape in plan view of the battery packaging material 10 from the base material layer side, the obtained cross-section was observed with a laser microscope (VKX-100 manufactured by KEYENCE CORPORATION), the thickness a of the metal layer at a first curved section, the thickness c of the metal layer at a second curved section, and the thickness b of the metal layer at a section situated between the first curved section and the second curved section were measured, and the relationship of the thicknesses a, b and c was determined. The results are shown in Table 1.

TABLE 1

| | Base material layer | Metal layer Material | Thickness (μm) | Sealant layer on metal layer side/ innermost layer side | Evaluation of moldability | Thickness (μm) of metal layer after molding at limit molding depth of 3.0 mm | | | |
|---|---|---|---|---|---|---|---|---|---|
| | | | | | | Thickness a | Thickness b | Thickness c | Relationship of a, b and c |
| Example 1 | Nylon | Aluminum alloy A | 35 | Acid-modified PP/PP | ○ | 35 | 34 | 30 | a ≥ b > c |
| Example 2 | Nylon | Aluminum alloy A | 30 | Acid-modified PP/PP | ○ | 30 | 29 | 25 | a ≥ b > c |
| Example 3 | Nylon | Aluminum alloy A | 25 | Acid-modified PP/PP | ○ | 25 | 24 | 20 | a ≥ b > c |
| Example 4 | Nylon | Aluminum alloy A | 20 | Acid-modified PP/PP | ○ | 20 | 20 | 15 | a ≥ b > c |
| Example 5 | Nylon | Aluminum alloy A | 15 | Acid-modified PP/PP | ○ | 15 | 15 | 10 | a ≥ b > c |
| Example 6 | PET/Nylon | Aluminum alloy A | 15 | Acid-modified PP/PP | ○ | 15 | 15 | 13 | a ≥ b > c |
| Example 7 | Nylon | Aluminum alloy A | 15 | Acid-modified PE/PE | ○ | 15 | 15 | 10 | a ≥ b > c |
| Example 8 | PBT | Aluminum alloy A | 15 | Acid-modified PP/PP | ○ | 15 | 15 | 11 | a ≥ b > c |
| Example 9 | PET | Aluminum alloy A | 15 | Acid-modified PP/PP | ○ | 15 | 15 | 13 | a ≥ b > c |
| Example 10 | Nylon | Aluminum alloy B | 35 | Acid-modified PP/PP | ○ | 32 | 26 | 31 | a ≥ c > b |
| Example 11 | Nylon | Aluminum alloy B | 30 | Acid-modified PP/PP | ○ | 28 | 27 | 27 | a ≥ c > b |
| Example 12 | Nylon | Aluminum alloy B | 25 | Acid-modified PP/PP | ○ | 23 | 16 | 22 | a ≥ c > b |
| Example 13 | Nylon | Aluminum alloy B | 20 | Acid-modified PP/PP | ○ | 19 | 15 | 18 | a ≥ c > b |
| Example 14 | Nylon | Aluminum alloy B | 15 | Acid-modified PP/PP | ○ | 14 | 10 | 14 | a ≥ c > b |
| Example 15 | PET/Nylon | Aluminum alloy B | 15 | Acid-modified PP/PP | ○ | 15 | 11 | 14 | a ≥ c > b |
| Example 16 | Nylon | Aluminum alloy B | 15 | Acid-modified PE/PE | ○ | 14 | 12 | 14 | a ≥ c > b |
| Example 17 | PBT | Aluminum alloy B | 15 | Acid-modified PP/PP | ○ | 15 | 11 | 14 | a ≥ c > b |
| Example 18 | PET | Aluminum alloy B | 15 | Acid-modified PP/PP | ○ | 14 | 12 | 14 | a ≥ c > b |
| Comparative Example 1 | Nylon | Aluminum alloy C | 35 | Acid-modified PP/PP | Δ | 13 | 20 | 34 | c ≥ b > a |
| Comparative Example 2 | Nylon | Aluminum alloy C | 30 | Acid-modified PP/PP | x | 11 | 18 | 29 | c ≥ b > a |
| Comparative Example 3 | Nylon | Aluminum alloy C | 25 | Acid-modified PP/PP | x | 10 | 16 | 24 | c ≥ b > a |
| Comparative Example 4 | Nylon | Aluminum alloy C | 20 | Acid-modified PP/PP | x | 9 | 16 | 19 | c ≥ b > a |

TABLE 1-continued

| | Base material layer | Metal layer Material | Thickness (μm) | Sealant layer on metal layer side/ innermost layer side | Evaluation of moldability | Thickness (μm) of metal layer after molding at limit molding depth of 3.0 mm | | | |
|---|---|---|---|---|---|---|---|---|---|
| | | | | | | Thickness a | Thickness b | Thickness c | Relationship of a, b and c |
| Comparative Example 5 | Nylon | Aluminum alloy C | 15 | Acid-modified PP/PP | x | 7 | 13 | 15 | c ≥ b > a |
| Comparative Example 6 | PET/ Nylon | Aluminum alloy C | 15 | Acid-modified PP/PP | x | 8 | 15 | 15 | c ≥ b > a |
| Comparative Example 7 | Nylon | Aluminum alloy C | 15 | Acid-modified PE/PE | x | 8 | 14 | 15 | c ≥ b > a |
| Comparative Example 8 | PBT | Aluminum alloy C | 16 | Acid-modified PP/PP | x | 7 | 13 | 15 | c ≥ b > a |
| Comparative Example 9 | PET | Aluminum alloy C | 15 | Acid-modified PP/PP | x | 7 | 13 | 15 | c ≥ b > a |

In Table 1, PET represents polyethylene terephthalate, PBT represents polybutylene terephthalate, PP represents polypropylene, and PE represents polyethylene.

Reference Example

Except that as the aluminum foil C, a 40 μm-thick aluminum foil was used in place of a 35 μm-thick aluminum foil, the same procedure as in Comparative Example 1 was carried out to produce a battery packaging A in the reference example, and evaluation of moldability, and measurement of the thickness (μm) of the metal layer after molding at a limit molding depth of 3.0 mm were performed in the following manner.

Preparation of Battery Packaging Material A

Nylon (thickness of 25 μm) for forming the base material layer 1, and the later-described aluminum foil C (thickness of 40 μm) for forming the metal layer 2 were used. The aluminum foil C was subjected to a chemical conversion treatment by applying a treatment solution composed of a phenol resin, a chromium fluoride compound (trivalent) and phosphoric acid in an amount of 10 mg/m$^2$ (dry weight) on both surfaces of the aluminum foil C by a roll coating method, and baking the film for 20 seconds under the condition that the film temperature was 180° C. or higher.

First, a laminate with the base material layer 1, the adhesive layer 2 and the metal layer 3 laminated in this order was prepared. Specifically, the adhesive layer 2 composed of a two-liquid urethane adhesive agent including a polyester-based main agent and an isocyanate-based curing agent was formed in a thickness of 3 μm on one surface of the base material layer 1, and bonded to a chemically converted surface of the metal layer 3 by pressurization and heating to prepare a laminate with the base material layer 1, the adhesive layer 2 and the metal layer 3 laminated in this order.

Separately, the sealant layer 4 composed of a two-layer co-extruded film having a configuration as described in Table 2 was provided. Each sealant layer 4 was a two-layer co-extruded film obtained by co-extruding a resin layer for forming a part on the metal layer side and a resin layer for forming a part on the innermost layer side. In Table 2, the thickness of acid-modified PP (unsaturated carboxylic acid graft-modified random polypropylene graft-modified with unsaturated carboxylic acid) is 20 μm, the thickness of PP (polypropylene (random copolymer)) is 15 μm, the thickness of acid-modified PE (unsaturated carboxylic acid graft-modified random polyethylene graft-modified with unsaturated carboxylic acid) is 20 μm, and the thickness of PE (polyethylene (random copolymer)) is 15 μm.

The prepared two-layer co-extruded film was then superimposed on the prepared laminate including the base material layer 1, the adhesive layer 2 and the metal layer 3 in such a manner that the resin layer for forming a part on the metal layer side in the two-layer co-extruded film was in contact with the metal layer of the laminate, and thermal lamination was performed by applying heat so that the temperature of the metal layer 3 was 120° C., thereby obtaining a laminate with the base material layer 1, the adhesive layer 2, the metal layer 3 and the sealant layer 4 laminated in this order. The obtained laminate was temporarily cooled, then heated to 180° C., and held at this temperature for 1 minute to be heat-treated, thereby obtaining the battery packaging material A.

Preparation of Aluminum Foil C

The aluminum foil C (thickness of 40 μm) was obtained by rolling an aluminum foil A8021 manufactured by Toyo Aluminium K.K. under the following conditions. The aluminum foil was rolled at 290° C. in a hot rolling step, then rolled at a cold rolling temperature of 100° C. in a cold rolling step, and treated at 390° C. for 1.5 hours in an intermediate annealing step.

Evaluation of Moldability

The battery packaging material A obtained as described above was cut to prepare a strip piece of 120×80 mm, and the strip piece was used as a test sample. A straight mold including a rectangular male mold of 30×50 mm, and a female mold with a clearance of 0.5 mm from the male mold was prepared, the test sample was placed on the female mold in such a manner that the sealant layer was situated on the male mold side, the test sample was pressed at a pressing pressure (surface pressure) of 0.1 MPa, and cold molding (draw-in one-step molding) was performed. The molding depth was changed in units of 0.5 mm, and at each molding depth, presence/absence of pinholes and cracks in the metal layer was checked for ten test samples. The molding depth at which none of the ten test samples had wrinkles, pinholes and cracks was defined as a limit molding depth, and moldability was evaluated in accordance with the following criteria. The results are shown in Table 2.

○: the limit molding depth is 6.0 mm or more.
Δ: the limit molding depth is 4.0 mm to 5.5 mm.
x: the limit molding depth is 3.5 mm or less.

Measurement of Thickness of Metal Layer After Molding at Limit Molding Depth of 3.0 mm In the same manner as in the above-described evaluation of moldability, a sample prepared from the battery packaging material A was molded at a limit molding depth of 3.0 mm. Next, the battery packaging material A after molding was divided into two parts by cutting the battery packaging material A in the thickness direction with a microtome (REM-710 RETRATOME manufactured by YAMATO KOHKI INDUSTRIAL CO., LTD.), on a straight line connecting mutually opposed corners of a portion protruding in a substantially rectangular shape in plan view of the battery packaging material from the base material layer side, the obtained cross-section was observed with a laser microscope (VKX-100 manufactured by KEYENCE CORPORATION), the thickness a of the metal layer at a first curved section, the thickness c of the metal layer at a second curved section, and the thickness b of the metal layer at a section situated between the first curved section and the second curved section were measured, and the relationship of the thicknesses a, b and c was determined. The results are shown in Table 2.

TABLE 2

| | | Metal layer | | Sealant layer on | | Thickness (μm) of metal layer after molding at limit molding depth of 3.0 mm | | | |
|---|---|---|---|---|---|---|---|---|---|
| | Base material layer | Material | Thickness (μm) | metal layer side/ innermost layer side | Evaluation of moldability | Thickness a | Thickness b | Thickness c | Relationship of a, b and c |
| Battery packaging material A | Nylon | Aluminum alloy C | 40 | Acid-modified PP/PP | ○ | 32 | 36 | 39 | c > b > a |

The above results show that in the battery packaging material A, the thickness a, b and c satisfy the relationship of c≥b>a, but the metal layer has a large thickness, and therefore the battery packaging material A is excellent in moldability similarly to the battery packaging materials in Examples 1 to 18.

DESCRIPTION OF REFERENCE SIGNS

1: Base material layer
2: Adhesive layer
3: Metal layer
4: Sealant layer
5: Adhesive layer
10: Battery packaging material
10a: Portion extruding in substantially rectangular shape
10b: Substantially rectangular parallelepiped space
11: Center portion in plan view of battery packaging material
12: First curved section
13: Section situated between first curved section and second curved section
14: Second curved section
15: End part

The invention claimed is:

1. A battery packaging material comprising a sheet-shaped laminate including at least a base material layer, a metal layer and a sealant layer laminated in this order, wherein
the battery packaging material is formed so as to protrude from the sealant layer side to the base material layer side, and includes a space on the sealant layer side that is configured to accommodate a battery element,
the battery packaging material includes a first curved section and a second curved section in this order from a center portion to an end part of the battery packaging material in a cross-section in the thickness direction on a straight line connecting mutually opposed corners of a portion protruding in plan view of the battery packaging material from the base material layer side, and
a thickness a of the metal layer at the first curved section, a thickness c of the metal layer at the second curved section, and a thickness b of the metal layer at a section situated between the first curved section and the second curved section satisfy the following relationship:

a≥b>c or a≥c>b.

2. The battery packaging material according to claim 1, wherein a thickness of the metal layer at the center portion of the portion protruding in plan view of the battery packaging material is less than 30 μm.

3. The battery packaging material according to claim 1, wherein the thickness a of the metal layer at the first curved section is less than 30 μm.

4. The battery packaging material according to claim 1, wherein the thickness b of the metal layer at the section situated between the first curved section and the second curved section is less than 30 μm.

5. The battery packaging material according to claim 1, wherein the thickness c of the metal layer at the second curved section is less than 30 μm.

6. The battery packaging material according to claim 1, wherein the metal layer is formed of an aluminum foil.

7. The battery packaging material according to claim 1, wherein an adhesive layer is laminated between the base material layer and the metal layer.

8. The battery packaging material according to claim 1, wherein the thickness a of the metal layer at the first curved section, the thickness c of the metal layer at the second curved section, and the thickness b of the metal layer at the section situated between the first curved section and the second curved section satisfy a≥b>c.

9. The battery packaging material according to claim 1, wherein the thickness a of the metal layer at the first curved section, the thickness c of the metal layer at the second curved section, and the thickness b of the metal layer at the section situated between the first curved section and the second curved section satisfy a≥c>b.

10. The battery packaging material according to claim 1, wherein the metal layer is formed of an Al—Fe-based aluminum foil.

11. The battery packaging material according to claim 1, wherein a thickness of the metal layer at the center portion of the portion protruding in plan view of the battery packaging material is 25 μm or less.

12. A battery comprising a battery element which includes at least a positive electrode, a negative electrode and an electrolyte, the battery element being stored in the battery packaging material according to claim 1.

* * * * *